(12) United States Patent
Shorter et al.

(10) Patent No.: US 7,987,287 B2
(45) Date of Patent: *Jul. 26, 2011

(54) METHOD AND SYSTEM FOR ROUTING DATA REPOSITORY MESSAGES BETWEEN COMPUTING DEVICES

(75) Inventors: David U. Shorter, Lewisville, TX (US); Brian P. Shorter, Corinth, TX (US)

(73) Assignee: International Business Machines Corporation, Armonk, NY (US)

( * ) Notice: Subject to any disclaimer, the term of this patent is extended or adjusted under 35 U.S.C. 154(b) by 590 days.

This patent is subject to a terminal disclaimer.

(21) Appl. No.: 12/029,358

(22) Filed: Feb. 11, 2008

(65) Prior Publication Data

US 2008/0244088 A1    Oct. 2, 2008

Related U.S. Application Data

(63) Continuation of application No. 10/081,952, filed on Feb. 22, 2002, now Pat. No. 7,356,607.

(51) Int. Cl.
*G06F 15/16* (2006.01)
*G06F 15/173* (2006.01)

(52) U.S. Cl. ....................................... 709/238; 709/230

(58) Field of Classification Search .................. 709/217, 709/236, 238, 230
See application file for complete search history.

(56) References Cited

U.S. PATENT DOCUMENTS

| | | | |
|---|---|---|---|
| 5,826,219 A | 10/1998 | Kutsumi | |
| 5,894,478 A | 4/1999 | Barzegar et al. | |
| 5,907,609 A | 5/1999 | Jeon | |
| 6,101,189 A | 8/2000 | Tsuruoka | |
| 6,243,669 B1 | 6/2001 | Horiguchi et al. | |
| 6,302,326 B1 * | 10/2001 | Symonds et al. | 235/379 |
| 6,424,976 B1 | 7/2002 | Jarvis et al. | |
| 6,523,172 B1 | 2/2003 | Martinez-Guerra et al. | |
| 6,542,464 B1 | 4/2003 | Takeda et al. | |
| 6,601,108 B1 | 7/2003 | Marmor | |
| 6,708,232 B2 | 3/2004 | Obara | |
| 6,856,992 B2 | 2/2005 | Britton et al. | |
| 6,950,437 B2 | 9/2005 | Peterson | |
| 7,167,924 B1 * | 1/2007 | Symonds et al. | 709/246 |
| 7,203,761 B1 | 4/2007 | Rai et al. | |
| 7,606,790 B2 * | 10/2009 | Levy | 1/1 |

* cited by examiner

*Primary Examiner* — Kristie D Shingles
(74) *Attorney, Agent, or Firm* — Novak, Druce + Quigg LLP

(57) ABSTRACT

A message router for routing data repository messages between a plurality of computer systems, wherein the computer systems include data repositories having disparate syntaxes. The message router can include a conversion engine for translating content in a received message from a syntax corresponding to a data repository of an originating computer system to a syntax corresponding to a data repository of at least one target computer system.

10 Claims, 4 Drawing Sheets

METHOD AND SYSTEM FOR ROUTING DATA REPOSITORY MESSAGES BETWEEN COMPUTING DEVICES

CROSS REFERENCE TO RELATED APPLICATIONS

This application is a continuation of, and accordingly claims the benefit from, U.S. patent application Ser. No. 10/081,952, now issued U.S. Pat. No. 7,356,607, which was filed in the U.S. Patent and Trademark Office on Feb. 22, 2002.

BACKGROUND OF THE INVENTION

1. Technical Field

This invention relates to the field of message processing, and more particularly, to facilitating communication between disparate information management systems.

2. Description of the Related Art

The efficient exchange of information and connectivity among disparate information management systems has become an essential aspect of conducting commerce. Such is the case whether the information management system is part of a supply chain, such as a retail establishment, a supplier, or a manufacturer, or the information management system must interact with another information management system. Although gains in connectivity between disparate systems have been made, deficiencies still exist.

Disparate information management systems often incorporate not only a wide variety of hardware platforms and operating systems, but also utilize a variety of disparate data storage and retrieval systems. Further complicating the problem, is that such systems, regardless of whether each system uses the same hardware/software solution, typically utilize different data structures to store information. Such data structure determinations are based upon an organization's need to store and retrieve specific data and particular attributes corresponding to that data. As these needs or business objectives vary among different entities, so too do the data structures used to store the data.

Another problem regarding communication between disparate information management systems is that naming conventions often vary significantly among these disparate systems. This results in identical data items being referenced by a different name from one system to the next. In consequence, efficient communication between such systems requires a translation from one naming convention to the another.

In an effort to overcome the aforementioned problems, some entities have altered their information management systems and the manner in which data is stored merely to ease data exchanges with other information management systems. This solution overlooks the fact that one method of organizing data may not be beneficial or desirable for other organizations having different business needs and objectives. Another solution has been to include a program or component within one's own information management system which can reconcile different naming conventions and attribute values between different systems, data sources, and databases. Implementation of this solution, as well as the previous solution, however, requires one entity to have knowledge of another entity's information management system. This knowledge is often extremely sensitive and confidential. Moreover, the inclusion of such a component within each information management system as part of a transactional chain can be redundant, as well as costly to develop and maintain.

SUMMARY OF THE INVENTION

The invention concerns a method and system for translating electronic commerce (e-commerce) transaction messages, including messages containing product information, from one data repository syntax to another data repository syntax within a centralized message router. The content conversion is accomplished by placing a conversion engine having a translation library within a message router. By placing the conversion engine within the message router, the invention disclosed herein can minimize redundant message conversions and eliminate the need for different entities to have knowledge of other entities' information management systems.

One aspect of the present invention can include a message router for routing data repository messages between a plurality of computer systems, including but not limited to, information processing systems such as e-commerce systems, inventory management systems, or other distributed database networks. The computer systems can include data repositories having disparate syntaxes. The message router can include a conversion engine for translating content in a received data repository message from a syntax corresponding to a data repository of an originating computer system to a syntax corresponding to a data repository of at least one target computer system.

The conversion engine can include a translation library configured to store information relating to the disparate syntaxes of the data repositories. The conversion engine further can include a reference processor configured to translate data structure and attribute name references within the data repository messages, an attribute processor configured to translate attribute values within the data repository messages, and an operation processor configured to translate data repository operations within the data repository messages. Still, the message router can include a communications processor for formatting data repository messages according to a suitable communications protocol.

Another aspect of the invention can include a method of routing messages in a message router. The method can include receiving a data repository message conforming to a first syntax from an originating computer system. The data repository message can include data structure references, attribute name references, attribute values, data repository operations, as well as one or more target computer systems. One or more target computer systems to which the received data repository message is directed can be determined. Based on the determined target computer system, a second syntax being disparate from the first syntax and corresponding to the target computer system can be identified. Content in the received data repository message can be converted from the first syntax to the second syntax and then sent to the target computer system. A translation library including information corresponding to the first and second syntax can be used for the conversion. Further, during the conversion step, a reference processor, an attribute processor, and an operation processor can convert data structure references, attribute name references, attribute values, and data repository operations respectively from one syntax to another.

If more than one target computer system is determined, a syntax corresponding to one or more of the identified target computer systems can be identified. Accordingly, the received data repository message can be converted from the first syntax to any of a variety of syntaxes corresponding to the target computer systems and for which the translation library includes corresponding translation information.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
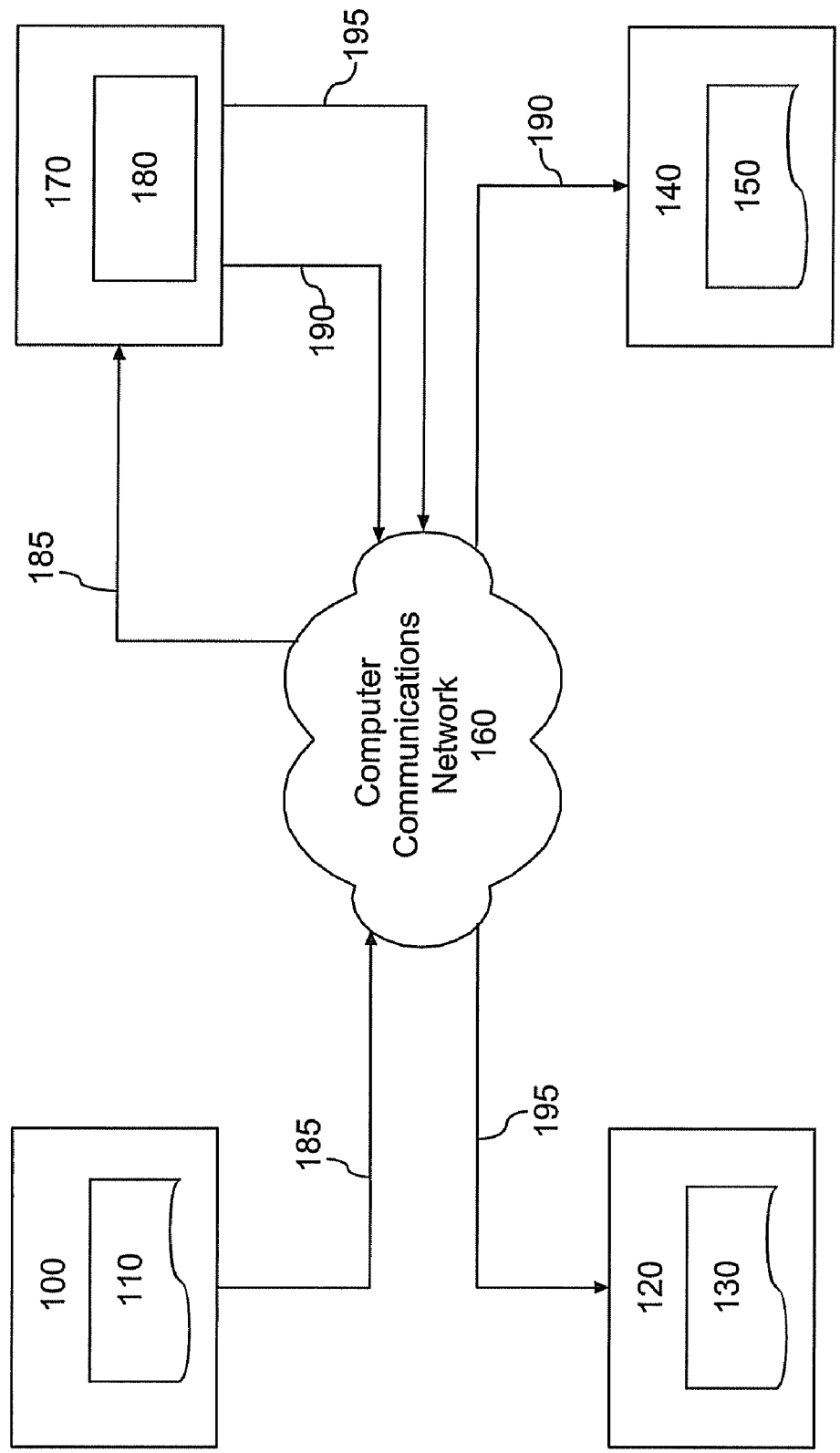
FIG. 1 is a schematic diagram illustrating an exemplary system for exchanging information among disparate information processing systems.

The invention provides a method and system for exchanging electronic commerce (e-commerce) messages among computer systems which use different syntaxes for storing data. The term "syntax", as used herein, refers to the particular naming conventions used for content stored within particular computer systems, rather than the formatting of a message itself. For example, in the case where a first database references product A as "123", and a second database references product A as "ABC", the two databases can be said to have different syntaxes. In other words, both databases refer to the same content, in this case product A, using different names or naming conventions.

Within a central location, the present invention can receive e-commerce messages, or transactional messages which can operate on data stored within a data repository, for example, e-commerce messages specifying a product or other item tracked within an inventory management system, such as an order. In the central location, the messages can be content converted. That is, content in the e-commerce messages can be translated from one data repository syntax into another data repository syntax. The messages subsequently can be routed to one or more target computer systems. Notably, the computer systems can exist within a variety of environments encompassing different hardware and software platforms, different data storage programs and data structures, as well as different naming conventions for data within those data structures.

In illustration, a retailer inventory management system capable of tracking inventory, sales, and other useful business information can track information relating to a particular product such as "Product X". Within the retailer inventory management system of the present invention, Product X can be referenced using an identifier such as SOAP123, can have an attribute of "Bath" indicating that Product X is a bath soap, and can have further attributes such as the brand name, color, price, etc.

The supplier system of the present invention, unlike the retailer inventory management system may be designed exclusively for selling cleaners. As such, the supplier system can store the identical Product X with a reference of CLEANER456 having a cleaner attribute of "Bath soap". As the supplier likely carries many more varieties of cleaning products than the retailer, the supplier system can include more attributes pertaining to cleaners than the merchant may consider relevant.

In consequence, as will be apparent from the above example, the data structures used by each party in their respective management systems can differ significantly. Accordingly, for the two merchants to directly and electronically communicate, i.e. initiate orders and correspondingly track inventories, any content in the data repository messages exchanged between the two must be translated from one data repository syntax to another. The present invention can facilitate such communications without requiring either party to have knowledge of the other party's information management system or computer systems.

FIG. 1 is a schematic diagram illustrating an exemplary system for routing data repository messages between multiple computer systems using disparate syntaxes. As shown in FIG. 1, computer systems 100, 120, and 140, as well as a message router 170, can be communicatively linked via a communications network 160. The communications network 160 can be the Internet where communication can be facilitated using TCP/IP, HTTP, XML, and FTP protocols, each well known in the art. Alternatively, communication can be facilitated though direct network access, a local area network, a wide area network, an Integrated Service Digital Network (ISDN) connection, or a series of direct dial up connections. Any suitable method and communications protocol for connecting computers or computing devices, including wireless connections and electronic data interchange (EDI) can be used.

Computer systems 100, 120, and 140 can be any of a variety of individual computing devices or distributed computer systems such that each system has an information processing capability. It should be appreciated that the computer systems 100, 120, and 140 can be located within one or more entities or organizations, whether private or public, including governmental agencies and/or businesses. Computer systems 100, 120, and 140 can include an information management system wherein data can be stored within data repositories 110, 130, and 150 respectively. The data repositories 110, 130, and 150 can include, but are not limited to, databases, spreadsheets, a series of forms and software facilitating form manipulations, an indexed file and tailored software designed to manipulate the indexed structure, a directory of files, a table, and the like.

The message router 170 can be communicatively linked to computer systems 100, 120, and 140 via the computer communications network 160. The message router 170 can be any device capable of routing messages between computing devices 100, 120, and 140 via the computer communications network 160. For example, the message router 170 can be implemented as a networking hub, router, or a computer system executing the appropriate software and operating at the networking level. Regardless of the specific implementation of the message router 170, as shown in FIG. 1, the message router 170 can include a conversion engine 180. The conversion engine 180 can convert data repository messages received from an originating computer system such as computer 100, and convert the message to a syntax that is recognizable to another target computer system such as computer system 120 or 140. For example, the conversion engine can translate or convert a message conforming to a syntax of the sending computer system's data repository to a syntax used by a target computer system's data repository at the application layer.

In operation, an originating computer system 110 can send a data repository message 185 via the computer communications network 160 to one or more target computer systems 120 or 140. The data repository message can include, but is not limited to, a message having at least one data repository operation and corresponding parameters. For example, a data repository message can include database commands, information capable of controlling a particular data repository, information that is common to different data repositories, or any combination thereof. The data repository message 185 can be received by the message router 170.

Using the conversion engine 180, the received message 185 can be processed to determine the target computer systems for which the message is intended. The conversion engine 180 can identify a syntax corresponding to the target computer systems and convert the incoming message accordingly. Notably, content of the incoming message 185 can be translated to one or more syntaxes depending upon the particular syntax used by the target computer systems. Once the data repository message 185 is translated, the message router 170 can route the translated messages 190 and 195 via the computer communications network 160 to the target computer systems 140 and 120 respectively.

It should be appreciated that message router 170 need not be restricted with regard to the type of message passing through the system. For example, the message router can be configured so that messages which are not data repository messages can nevertheless be routed through the message router 170 to their target computer systems. Such messages can pass through the conversion engine 180 unaffected, or alternatively, can bypass the message conversion engine 180. Data repository messages which cannot be converted by the message conversion engine 180 similarly can pass through the conversion engine unaffected or bypass the conversion engine altogether. For example, if the conversion engine does not have an entry corresponding to the originating location and/or the target location, the message can pass through the conversion engine unaffected. Other methods of identifying data repository messages requiring conversion can be implemented as well. For example, the message can include an identifier or a call to the conversion engine to initiate translation. Still, in one embodiment of the present invention, different target or originating computer systems can register with the message router 170 for receiving particular messages.

Figure 2:
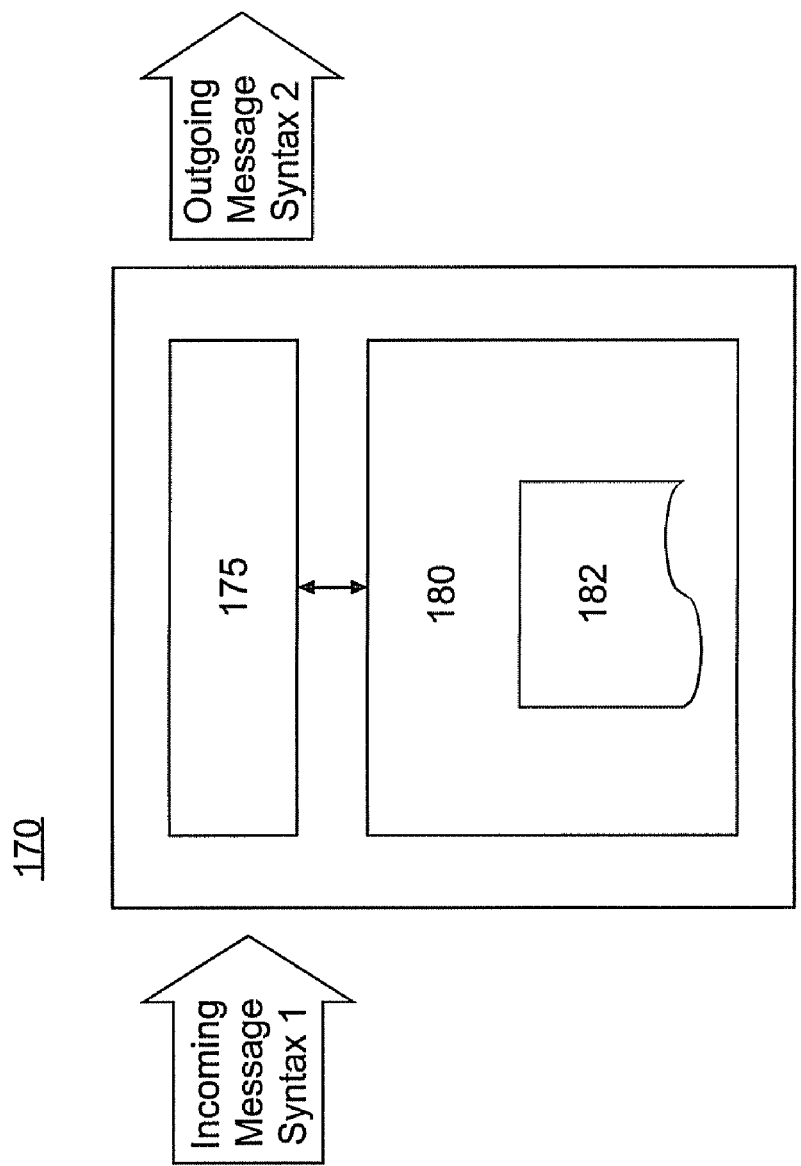
FIG. 2 is a schematic diagram illustrating an exemplary message router in accordance with the inventive arrangements disclosed herein.

FIG. 2 is a schematic diagram illustrating an exemplary embodiment of the message router 170 of FIG. 1. As shown in FIG. 2, the message router 170 can include a communications processor 175 and a conversion engine 180. The communications processor 175 can process incoming and outgoing messages to provide any necessary communications protocol formatting of the messages. Further, the communications processor 175 can process received messages to determine the target computer systems to which the incoming message is directed.

The conversion engine 180, as mentioned, can convert the syntax of an incoming message to a syntax used by one or more of the target computer systems to which the message is directed. The conversion engine can include a translation library 182 which can store information corresponding to the particular syntaxes used by the data repositories of the target computer systems. For example, the translation library 182 can be a database containing table name, attribute name, and attribute value cross references for computer systems, both originating and target computer systems, being registered with the message router 170. Accordingly, the content of a message can be translated from the syntax of the originating computer system to a syntax of a subscribing target computer system. Notably, if a message is to be routed to more than one target computer system, the received message can be translated into any number of target computer system syntaxes and delivered accordingly.

Figure 3:
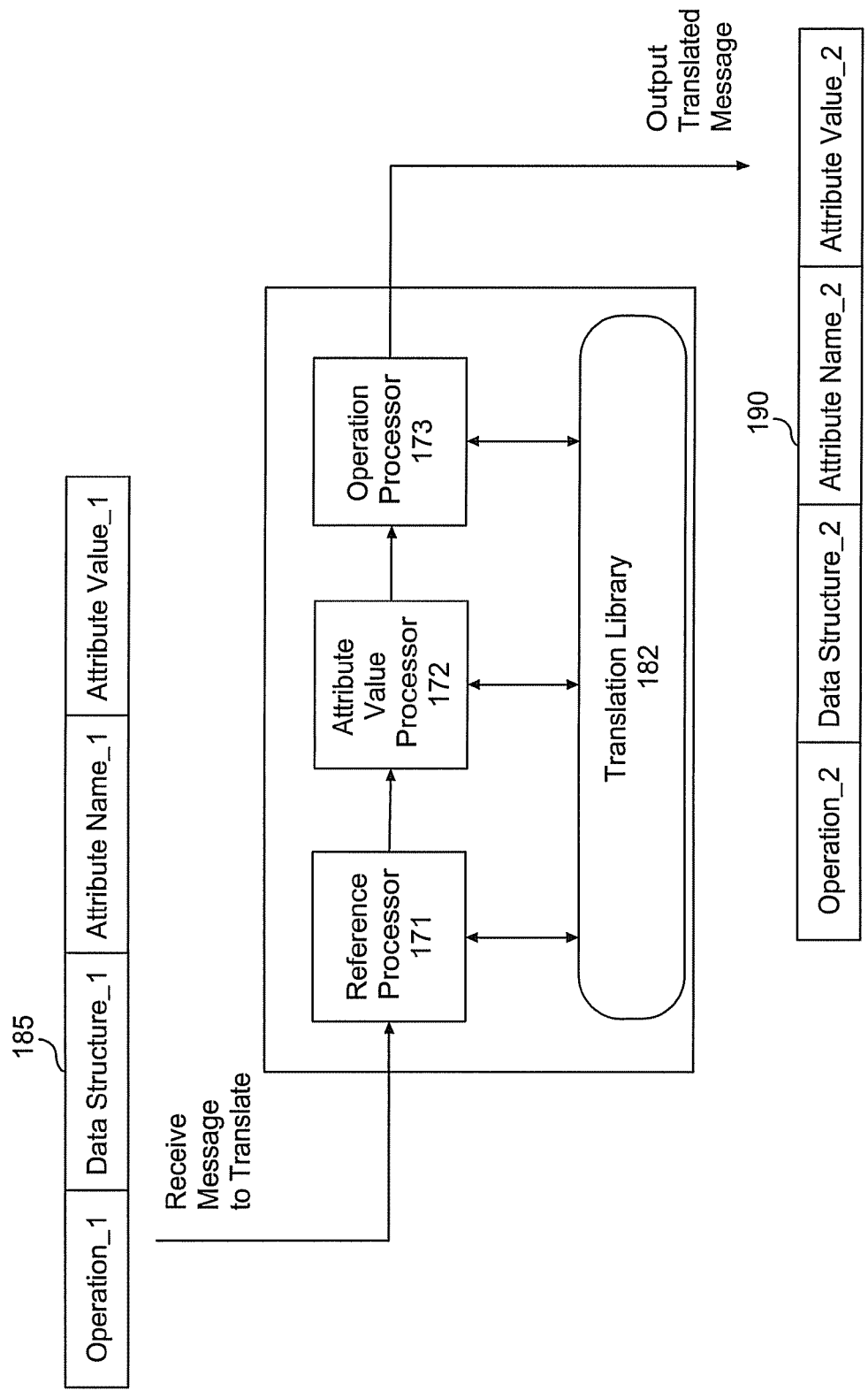
FIG. 3 is a schematic diagram illustrating message processing according to one embodiment of the invention.

FIG. 3 is a schematic diagram illustrating an example of message processing according to another embodiment of the message router 170. As shown, a data repository message 185 conforming to a first syntax can be received by the message router 170. The data repository message 185 can be provided to the conversion engine 180, for example, after any necessary processing by the communications processor. The data repository message 185 can include an operation_1, a data structure name_1, an attribute name_1, an attribute value_1, as well as the identity of one or more target computer systems. The reference processor 171, using the translation library 182, can determine the appropriate target computer system syntax cross-references for any identified data structures and attribute names such as data structure_1 and attribute name_1. The reference processor 171 can translate the message fields accordingly. Similarly, the attribute value processor 172 can determine the target computer system syntax cross-references for any attribute values such as attribute value_1 and translate those message fields accordingly. The operation processor 173 can determine the target computer system syntax cross-references for the any identified operations such as operation_1 and translate those message fields in a similar manner. The resulting outgoing message 190 can conform to a syntax 2 which corresponds to the syntax of the target computer system to which the message can be directed. Prior to routing the message to the target computer system, the message can be further processed by the communications processor if necessary.

Figure 4:
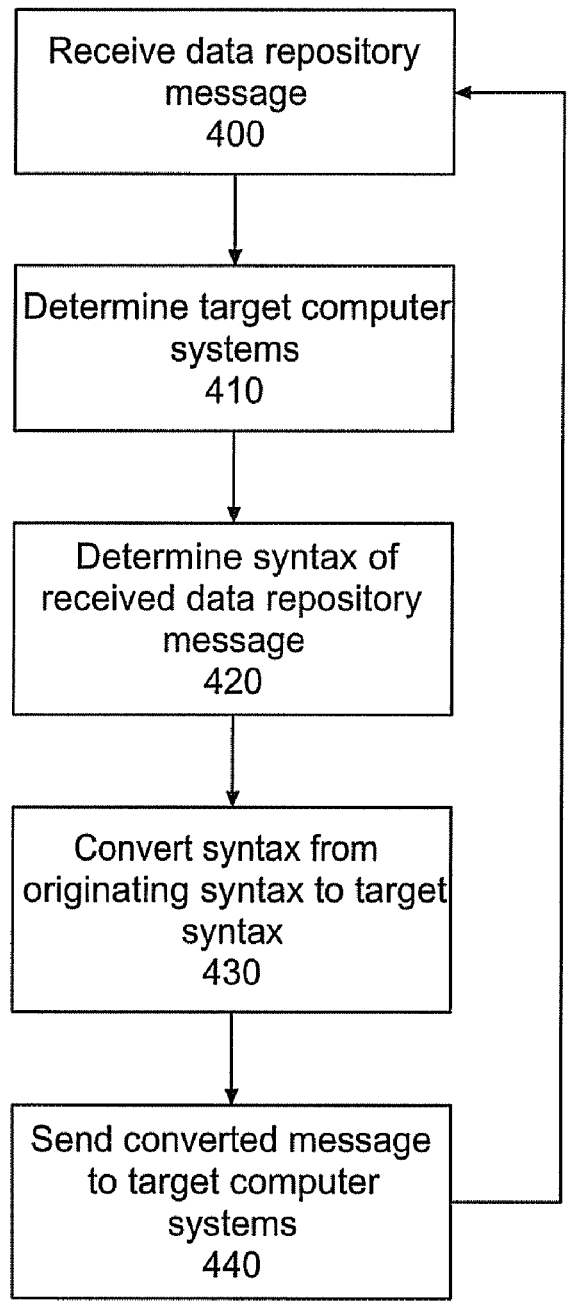
FIG. 4 is a flow chart of an exemplary method of routing data repository messages in accordance with the inventive arrangements disclosed herein.

FIG. 4 is a flow chart illustrating an exemplary method of processing data repository messages as performed by the message router disclosed herein. The method can begin in step 400 where a data repository message can be received. In step 410, the data repository message can be processed to determine the target computer systems for which the data repository message is directed. As previously mentioned, the received message can be intended for one or more target computer systems wherein each target computer system can utilize an independent syntax. After step 410, the method can continue to step 420.

In step 420, the syntax used by the data repositories of the target computer systems can be identified. In step 430, using the translation library, the received message can be converted from the syntax of the originating computer system to the syntax used by the target computer system. If more than one target computer system exists, the message can be translated into a plurality of outgoing messages conforming to the syntaxes of the target computer systems or particular syntaxes of the target computer systems. After step 430, the method can continue to step 440 where the resulting message or messages can be routed to the target computer systems.

The present invention can be realized in hardware, software, or a combination of hardware and software in a centralized fashion within a computer system. Any kind of computer system with a computer program which, when loaded and executed, controls the computer system such that it carries out the methods described herein can be used. Computer program in the present context means any expression, in any language, code or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof; and, accordingly, reference should be made to the following claims, rather than to the foregoing specification, as indicating the scope of the invention.

What is claimed is:

1. A system for routing data repository messages among disparate information management systems, comprising:
 a plurality of computer systems, each computer system belonging to a different information management system of a different entity and having a data repository for storing data according to a different syntax, wherein a syntax refers to particular naming conventions used for content stored within particular computer systems; and
 a central message router in communication with, and remotely located from, each of the plurality of computer systems,
 wherein the message router includes a conversion engine to translate content in a received data repository message from a syntax corresponding to a data repository of an originating computer system to a syntax corresponding to a data repository of at least one target computer system;
 wherein the message router is configured to recognize from data contained in the data repository message the syntax corresponding to the data repository of the originating computer system, to identify from data contained in the data repository message the at least one target computer system, and to recognize based on the identity of the at least one target computer system the syntax corresponding to the data repository of the at least one target computer system;
 wherein the message router further includes a translation library configured to store information for converting each of the different syntaxes into each other of the different syntaxes, the plurality of computer systems being registered with the central message router to provide cross references of the different syntaxes in the translation library.

2. The system of claim 1, further comprising:
 a communications processor configured to format said received data repository message according to a suitable communications protocol.

3. The system of claim 1, wherein particular ones of said computer systems include distributed database networks.

4. The system of claim 1, wherein said conversion engine further comprises a reference processor configured to translate data structure and attribute name references within said data repository messages.

5. The system of claim 4, wherein said conversion engine further comprises an attribute processor configured to translate attribute values within said data repository messages.

6. The system of claim 5, wherein said conversion engine further comprises an operation processor configured to translate data repository operations within said data repository messages.

7. A non-transitory machine-readable storage, having stored thereon a computer program having a plurality of code sections executable by a machine for causing the machine to perform the steps of:
 in a central message router, receiving a data repository message from an originating computer system, said data repository message conforming to a first syntax and said message router remotely located from said originating computer system;
 recognizing based upon data contained in the data repository message the syntax corresponding to the data repository of the originating computer system;
 determining from the data contained in the data repository message a target computer system to which said received data repository message is directed, said target computer system remotely located from said originating computer system and said message router;
 based on said determined target computer system determined on the basis of the data contained in the data repository message, identifying a second syntax corresponding to said target computer system, wherein said first syntax and said second syntax are disparate;
 converting content in said received data repository message from said first syntax to said second syntax, the conversion being effected by said message router and based upon syntax information contained in a translation library residing on said message router; and
 sending said received and converted data repository message to said target computer system;
 wherein the originating computer system and the target computer system each belongs to a different information management system of a different entity;
 wherein a syntax refers to particular naming conventions used for content stored within particular computer systems; and
 wherein the originating computer system and the target computer system are registered with the central message router to provide cross references of the disparate syntaxes in the translation library.

8. The machine-readable storage of claim 7, wherein said data repository message includes at least one of a data structure reference, an attribute name reference, an attribute value, and a data repository operation, said converting step further comprising:
 translating said data structure and said attribute name references using a reference processor;
 translating said attribute value using an attribute processor; and
 translating said data repository operation using an operation processor.

9. A non-transitory machine-readable storage, having stored thereon a computer program having a plurality of code sections executable by a machine for causing the machine to perform the steps of:
 in a message router, receiving a data repository message from an originating computer system, said data repository message conforming to a first syntax, and said message router remotely located from said originating computer system;
 recognizing based upon data contained in the data repository message the first syntax corresponding to the data repository of the originating computer system;
 determining from the data contained in the data repository message a plurality of target computer systems to which said received data repository message is directed, said target computer systems each being remotely located from said originating computer system and said message router;
 based on said determined plurality of target computer systems determined on the basis of the data contained in the data repository message, identifying at least one syntax for particular ones of said plurality of target computer systems, wherein said at least one identified syntax and said first syntax are disparate;
 converting content in said received data repository message from said first syntax to said at least one syntax of said particular ones of said plurality of target computer systems, the conversion being effected by said message router and based upon syntax information contained in a translation library residing on said message router; and sending said received and converted data repository message to said particular ones of said plurality of target computer systems;

wherein the originating computer system and the target computer systems each belongs to a different information management system of a different entity;

wherein a syntax refers to particular naming conventions used for content stored within particular computer systems; and wherein the originating computer system and the target computer systems are registered with the central message router to provide cross references of the disparate syntaxes in the translation library.

10. The machine-readable storage of claim 9, Wherein said data repository message includes at least one of a data structure reference, an attribute name reference, an attribute value, and a data repository operation, said converting step further comprising:

translating said data structure and said attribute name references using a reference processor;

translating said attribute value using an attribute processor; and translating said data repository operation using an operation processor.

* * * * *